US009303652B2

(12) United States Patent
Prior et al.

(10) Patent No.: US 9,303,652 B2
(45) Date of Patent: Apr. 5, 2016

(54) ELECTRIC BLOWER OPERABLE TO PROVIDE COMBUSTION AIR TO A FIRE

(75) Inventors: Bruce Prior, Lakewood, CO (US); George Prior, Culver City, CA (US)

(73) Assignee: Archipelago Group LLC, Lakewood, CO (US)

( * ) Notice: Subject to any disclaimer, the term of this patent is extended or adjusted under 35 U.S.C. 154(b) by 228 days.

(21) Appl. No.: 13/344,472

(22) Filed: Jan. 5, 2012

(65) Prior Publication Data
US 2013/0177859 A1    Jul. 11, 2013

(51) Int. Cl.
| F23N 1/02 | (2006.01) |
| F04D 25/08 | (2006.01) |
| B23Q 1/25 | (2006.01) |
| B23Q 3/06 | (2006.01) |
| F04D 13/06 | (2006.01) |
| F23B 90/02 | (2011.01) |
| F04D 25/06 | (2006.01) |
| F04D 29/40 | (2006.01) |
| F04D 29/60 | (2006.01) |
| A47J 37/07 | (2006.01) |

(52) U.S. Cl.
CPC ............. *F04D 25/08* (2013.01); *A47J 37/0754* (2013.01); *B23Q 1/25* (2013.01); *B23Q 3/06* (2013.01); *F04D 13/06* (2013.01); *F04D 25/068* (2013.01); *F04D 25/0673* (2013.01); *F04D 25/084* (2013.01); *F04D 29/403* (2013.01); *F04D 29/601* (2013.01); *F23B 90/02* (2013.01)

(58) Field of Classification Search
USPC ................. 269/55, 97; 431/12; 417/423.14, 417/423.15; 126/15 A, 25 B; 34/96, 97
See application file for complete search history.

(56) References Cited

U.S. PATENT DOCUMENTS

| 1,108,053 | A | * | 8/1914 | Wiwi et al. | 417/411 |
| D191,108 | S | * | 8/1961 | Dahlen | D32/64 |
| 3,191,556 | A | * | 6/1965 | Hottenroth et al. | 126/25 B |
| 3,362,586 | A | * | 1/1968 | Dedoes | 222/103 |
| 3,697,198 | A | * | 10/1972 | Holder, Jr. | 417/411 |
| 4,044,750 | A | | 8/1977 | Zeigler | |
| 4,190,034 | A | * | 2/1980 | Wonisch | 126/25 B |
| 4,734,017 | A | * | 3/1988 | Levin | 417/366 |
| 4,809,399 | A | * | 3/1989 | Hersker | 16/8 |
| 4,810,173 | A | * | 3/1989 | Thomson et al. | 417/411 |
| 4,884,314 | A | | 12/1989 | Miner et al. | |
| 4,934,222 | A | * | 6/1990 | Rittmann et al. | 81/427.5 |
| 5,115,566 | A | * | 5/1992 | Zeitlin | 30/142 |
| 5,341,578 | A | * | 8/1994 | Anderson | 34/97 |
| 5,658,128 | A | * | 8/1997 | Green | 415/121.3 |
| 5,725,356 | A | * | 3/1998 | Carter | 416/240 |
| 5,839,204 | A | * | 11/1998 | Cinque et al. | 34/97 |
| 5,873,178 | A | * | 2/1999 | Johnson | 34/90 |
| 5,890,882 | A | * | 4/1999 | Feldman | 417/411 |

(Continued)

*Primary Examiner* — Kenneth Rinehart
*Assistant Examiner* — Jason Lau
(74) *Attorney, Agent, or Firm* — Marsh Fischmann & Breyfogle LLP

(57) ABSTRACT

A blower for use to accelerate combustion by providing additional air to a fire (e.g., to assist in the lighting of a fire). The blower may include a cylindrical housing having an inlet opening and an outlet opening with a bore extending therebetween. A fan assembly and power source may be disposed in the bore and be operable to induce air flow through the bore. Air exiting the outlet opening may travel in a direction substantially parallel with a central axis of the cylindrical housing. The blower may be supported by an infinitely adjustable flexible member that may be manipulated to position the blower with respect to the fire to provide outlet air to the fire.

13 Claims, 6 Drawing Sheets

(56) References Cited

U.S. PATENT DOCUMENTS

| | | | |
|---|---|---|---|
| 5,940,980 A * | 8/1999 | Lee et al. | 34/97 |
| 6,175,998 B1 * | 1/2001 | Leo | 29/268 |
| 6,182,329 B1 | 2/2001 | Lin | |
| D462,775 S * | 9/2002 | Minor | D24/199 |
| 6,571,788 B1 | 6/2003 | Goldstein | |
| 6,615,820 B1 | 9/2003 | Ferreira et al. | |
| D487,688 S * | 3/2004 | Brass et al. | D8/72 |
| D515,386 S * | 2/2006 | Noniewicz et al. | D8/72 |
| 7,028,992 B2 * | 4/2006 | Rajendren | 261/28 |
| 7,165,762 B1 * | 1/2007 | Duzick | 269/45 |
| 7,441,313 B2 * | 10/2008 | Degen | 24/512 |
| 7,471,883 B2 * | 12/2008 | Seutter et al. | 392/381 |
| D625,978 S * | 10/2010 | Zeng | D8/52 |
| 2006/0098961 A1 * | 5/2006 | Seutter et al. | 392/383 |
| 2007/0044784 A1 * | 3/2007 | Thompson | 126/25 B |
| 2007/0094884 A1 * | 5/2007 | Micheludis | 34/107 |
| 2008/0168977 A1 | 7/2008 | Daud | |
| 2010/0162518 A1 | 7/2010 | Ward | |
| 2011/0041354 A1 * | 2/2011 | Williams | 34/239 |

\* cited by examiner

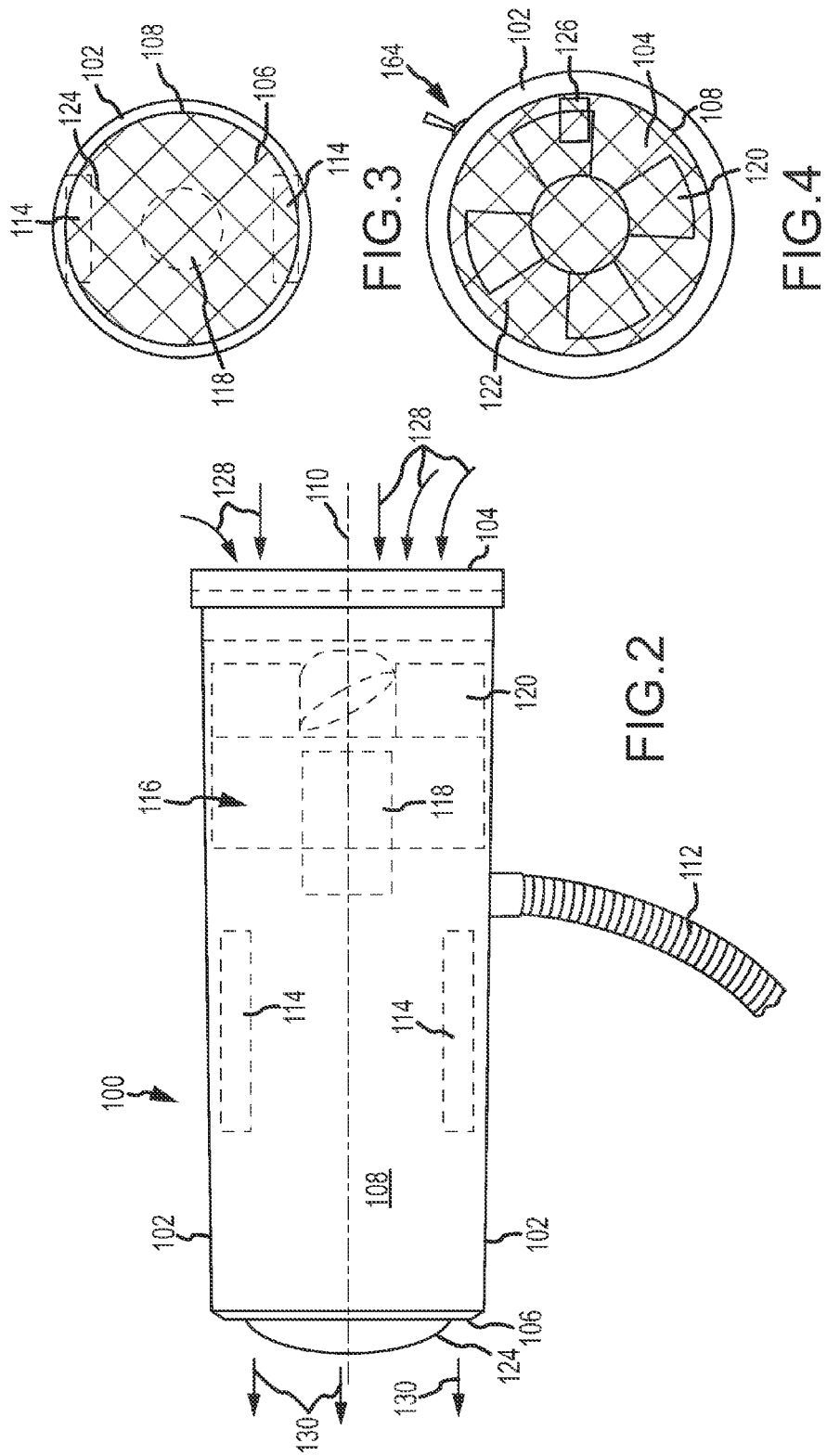

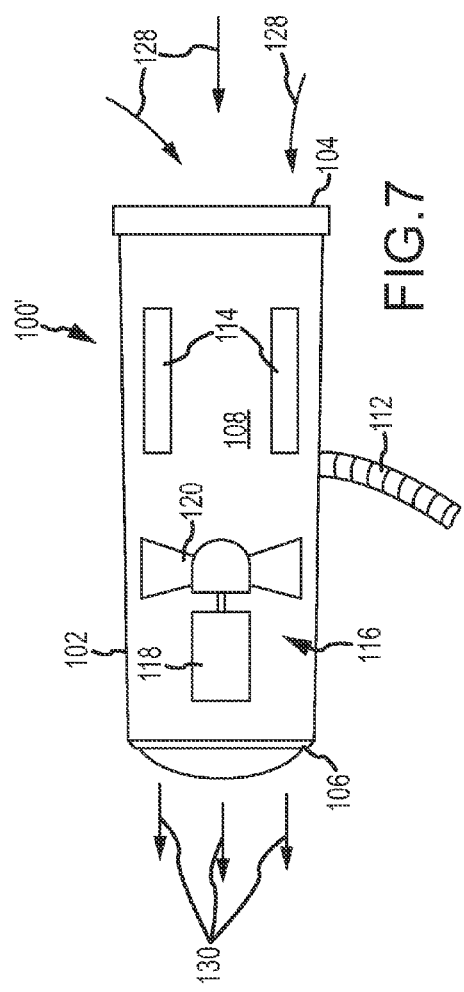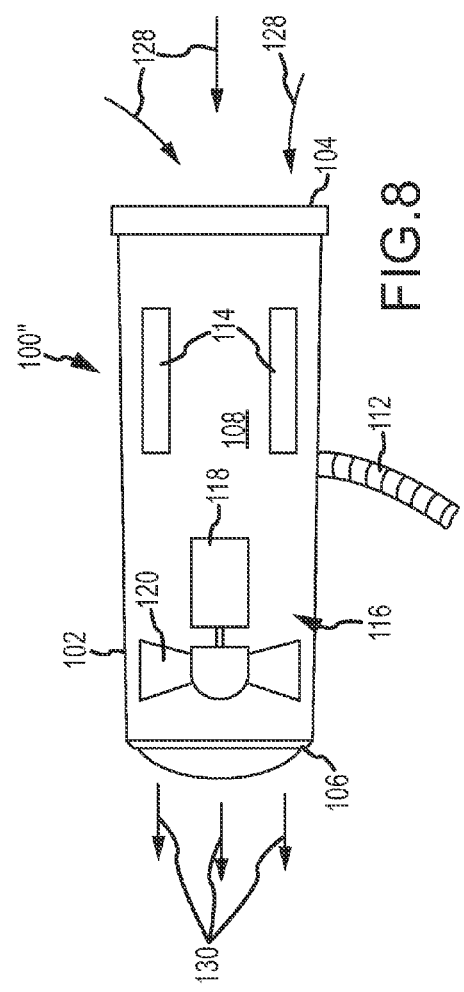

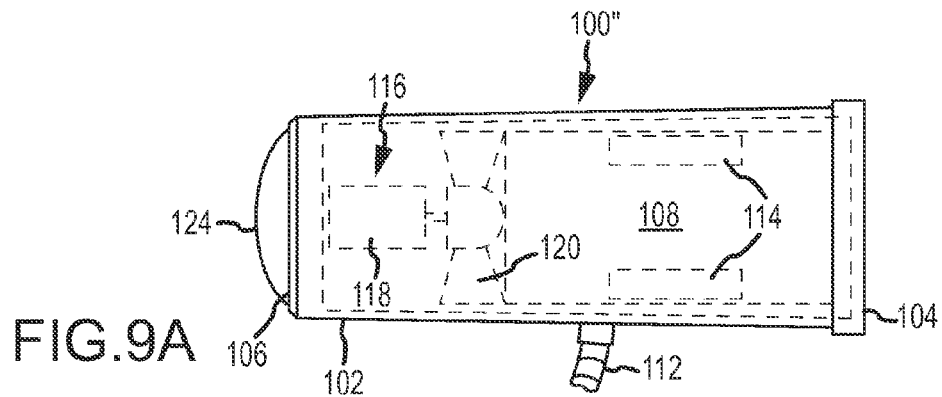
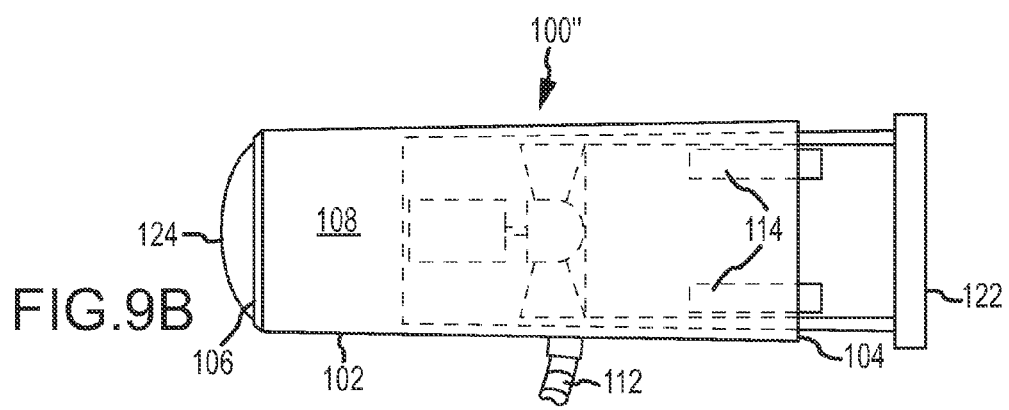
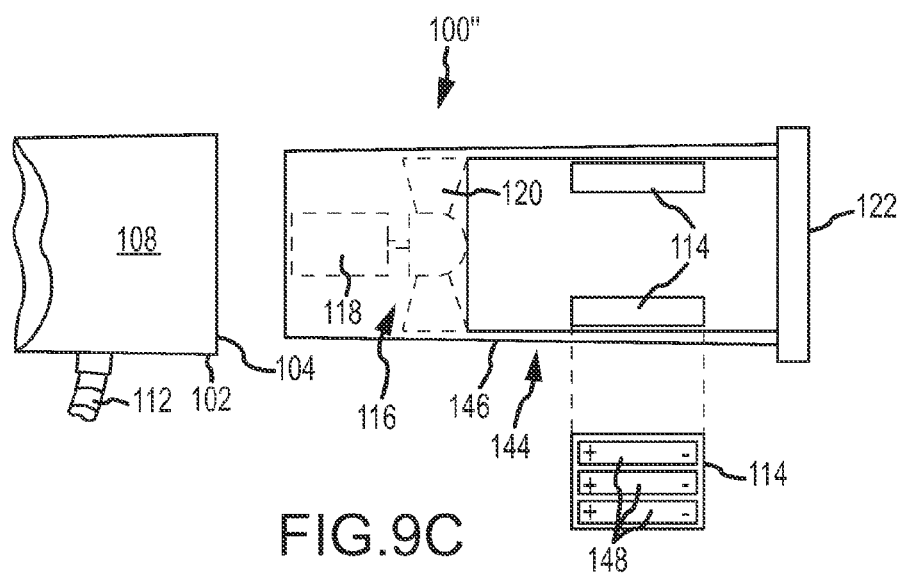

ELECTRIC BLOWER OPERABLE TO PROVIDE COMBUSTION AIR TO A FIRE

BACKGROUND

It is often desirable to accelerate the combustion process of a fire (e.g., when lighting the fire). For example, accelerating a fire may be desired in the context of a charcoal grill, fireplace, wood-stove, campfire, or other fire. Blowing air on a fire is an established method of increasing the rate of combustion in that the amount of available oxygen supplied to the burning fuel is increased. For example, a traditional fireplace tool, though less frequently seen today, is a simple "bellows" that is used to direct air towards burning tinder while starting a fireplace fire. However, traditional bellows are bulky, require two hands to operate, and blow air in low volume spurts. This may result in extinguishing any fire that has been established or may dangerously blow ash or embers from the fire.

One common example of where it is desirable to increase the rate of combustion of a fire is during the lighting a charcoal grill. Some individuals who would otherwise like to enjoy the taste of food cooked on a charcoal grill may use gas grills (e.g., propane grills) instead of a charcoal grill because of the difficulty and time requirements of cooking on charcoal. For example, it may take too long to establish the coals of a charcoal fire for cooking. Some methods have been proposed to speed the lighting of charcoal, such as, for example, starter chimneys, electric heaters, and the use of blowers that are not specifically designed for operation to aid in combustion (e.g., hairdryers and the like). However, each of the foregoing fails to provide a simple, safe, and effective method for assisting in the lighting of a fire. Accordingly, those individuals that would otherwise enjoy the use of a charcoal grill turn to other cooking methods, such as propane grills, due to the hassle of lighting charcoal grills.

SUMMARY

In light of the foregoing, the present disclosure is generally related to an efficient, easy to use electric blower that is operable to provide combustion air to a fire. Unlike previous approaches, the electric blower of the present invention provides a safe, convenient way of accelerating the combustion of a fire so as to facilitate quicker start times for charcoal grills, fireplaces, wood stoves, campfires, or the like. The electric blower of the present disclosure may securely be attached to a structure adjacent to the fire to provide a low velocity, high volume supply of combustion air to a fire. Accordingly, the electric blower may facilitate the acceleration combustion to rapidly establish a fire for the purposes of for example, warmth or cooking.

A first aspect disclosed herein includes an electric blower operable to provide combustion air to a fire. The blower includes a cylindrical housing defining a bore extending from an inlet opening of the housing to an outlet opening of the housing. The bore extends along at least a portion of a central axis of the cylindrical housing. The blower also includes a fan assembly disposed within the bore between the inlet opening and the outlet opening. The fan assembly has an axis of rotation substantially coaxial with the central axis. The blower also includes a power source that is disposed in the bore and is in operative communication with the fan assembly to power the fan assembly. The fan assembly is rotatable about the axis of rotation to induce air flow through the bore between the inlet opening and the outlet opening such that air is expelled from the outlet opening in a direction substantially parallel with the central axis. The cylindrical housing is positionable with respect to the fire to direct air toward the fire, thus providing combustion air to the fire.

A number of feature refinements and additional features are applicable to the first aspect. These feature refinements and additional features may be used individually or in any combination. As such, each of the following features that will be discussed may be, but are not required to be, used with any other feature or combination of features of the first aspect described above.

For example, in one embodiment the cylindrical housing may be operatively connected to a flexible member for supportive engagement of the cylindrical housing by the flexible member. The flexible member may be manipulable to position the cylindrical housing with respect to the fire so as to direct air exiting the outlet opening travels toward the fire. The cylindrical housing may be positionable at least by way of one of translation of the cylindrical housing in a direction transverse to the central axis, translation of the cylindrical housing in a direction along the central axis, or rotation of the cylindrical housing about a rotation axis transverse to the central axis. Accordingly, the flexible member may be infinitely adjustable to define a continuum of blower positions.

In an embodiment, the flexible member may be operatively engaged with a clip for selective attachment of the electric blower to a support structure. The clip may comprise a clamp member having opposing jaws members pivotal about a hinge. A jaw opening centerline may be defined between the hinge and an interface of the opposing jaw members when closed, and the clip may comprise handle portions extending in a direction extending away from the jaw opening centerline.

In another embodiment, the power source may comprise at least one battery. The at least one battery may be rechargeable. Additionally or alternatively, the fan assembly and the power source may comprise a removable unit that is selectively removable from the cylindrical housing. As such, the power source may be removed from the cylindrical housing for replacement (e.g., with standard sized batteries such as AAA, AA, C, or D sized batteries).

In one embodiment, the inlet opening may be disposed at a first end portion of the cylindrical housing and the outlet opening may be disposed at a second end portion of the cylindrical housing opposite the first end portion. As such, when the cylindrical housing is positioned with respect to the fire so as to direct air exiting the outlet opening toward the fire, the inlet opening may be disposed further from the fire than the outlet opening. The inlet opening may comprise substantially the entire cross sectional area of the cylindrical housing at the first end portion and the outlet opening may comprise substantially the entire cross sectional area of the cross sectional housing at the second end portion. In one embodiment, the outlet opening may be smaller than the inlet opening.

The blower may be adapted for indoor or outdoor use. In this regard, the blower may be constructed such that the blower is capable of withstanding relatively harsh outdoor conditions. For example, the cylindrical housing may comprise stainless steel. Furthermore, the blower may be electrically insulated such that the power source and fan assembly may be exposed to weather conditions commonly experienced outdoors (e.g., rain, snow, or other moisture) and remain operable in a safe manner, i.e., without the risk of electric shock.

In still another embodiment, the blower may include a fan controller in operative communication with the fan assembly that is operable to control the speed of the fan assembly.

Another aspect included herein is a method for providing combustion air to a fire. The method includes securing an electric blower to a structure adjacent to the fire. The electric blower provided may be as described above with respect to the first aspect. That is, the electric blower of the second aspect includes a cylindrical housing defining a bore extending from an inlet opening of the housing to an outlet opening of the housing such that the bore extends along at least a portion of the central axis of a cylindrical housing. The method further includes operating a fan assembly disposed within the bore between the inlet opening and the outlet opening, wherein the fan assembly has an axis of rotation substantially coaxial with the central axis. The method further includes inducing air flow through the bore between the inlet opening and the outlet opening in response to the operating such that air is expelled from the outlet opening in a direction substantially parallel with the central axis. The method further includes positioning the cylindrical housing with respect to the fire such that the air expelled from the outlet opening is directed toward the fire.

A number of feature refinements and additional features are applicable to the second aspect of the present invention. These feature refinements and additional features may be used individually or in any combination. As such, each of the following features that will be discussed may be, but are not required to be, used with any other feature or combination of features of the second aspect.

For example, the securing may include attaching a clip to the structure. The clip may be operatively connected to the cylindrical housing by way of a flexible member extending therebetween. Additionally, the positioning may include manipulation of the flexible member. In any regard, the positioning may include at least one of translation of the cylindrical housing in a direction transverse to the central axis, translation of the cylindrical housing in a direction along the central axis, or rotation of the cylindrical housing about a rotation axis transverse to the central axis.

BRIEF DESCRIPTION OF THE DRAWINGS

FIG. 2 depicts a cross-sectional view of the embodiment of a blower shown in FIG. 1.

FIG. 3 depicts a left end view of an outlet opening of the embodiment of a blower shown in FIG. 1.

FIG. 4 depicts a right end view of an inlet opening of the embodiment of a blower shown in FIG. 1.

FIG. 7 depicts a cross sectional view of another embodiment of a blower.

FIG. 8 depicts a cross sectional view of yet another embodiment of a blower.

FIGS. 9A-9C depict a progression of a removable unit being removed from a cylindrical housing.

DETAILED DESCRIPTION

The following description is not intended to limit the invention to the form disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Figure 1:
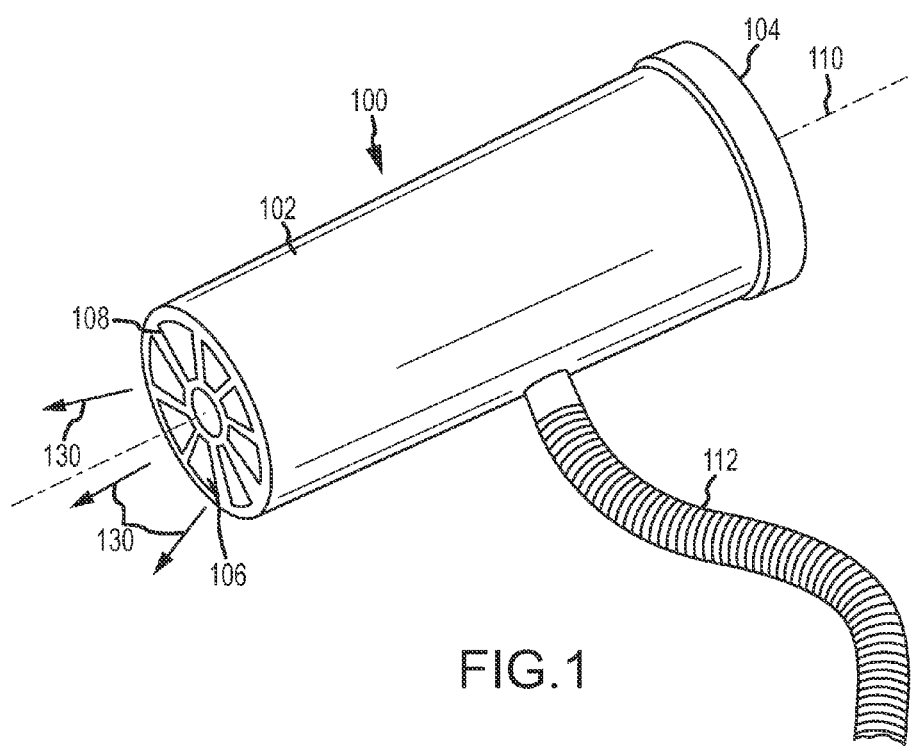
FIG. 1 depicts a perspective view of an embodiment of a blower.

FIG. 1 illustrates one embodiment of blower 100. The blower 100 may include a cylindrical housing 102 supportively engaged by a flexible member 112. The cylindrical housing 102 includes central axis 110. On a first end of the cylindrical housing 102 there may be an inlet opening 104. On a second end, opposite to the first end, may be an outlet opening 106. A bore 108 may extend through the cylindrical opening 102 between the inlet opening 104 the outlet opening 106. In this regard, a fan assembly 116 (shown in FIG. 2) may be operative to draw air into the inlet opening 104 and induce air flow through the bore 108 such that it exits the outlet opening 106. The outlet air 130 may exit the outlet opening 106 in a direction substantially parallel with the central axis 110. In this regard, the cylindrical housing 102 may be positioned by manipulating the flexible member 112 such that the central axis 110 is aligned with (e.g., aimed at) the fire. As such, the fan assembly 116 may act to provide outlet air 130 in the direction of the fire such that the fire may be supplied with additional air to accelerate combustion.

In one embodiment, the cylindrical housing 102 may have a length of not less than about 5 inches (12.7 cm) and not more than about 10 inches (25.4 cm). In a particular embodiment, the cylindrical housing 102 may have a length of approximately 7 inches (17.8 cm). Additionally, the inlet opening 104 may be smaller than the outlet opening 106. For example, the inlet opening may be about 2.75 inches (7 cm) in diameter and the outlet opening may be about 2.5 inches (6.4 cm) in diameter. In other embodiments, the inlet opening 104 may be not less than about 2 inches (5 cm) and not greater than about 4 inches (10 cm). The outlet opening 104 may be not less than about 2.5 inches (6.4 cm) and not greater than about 5 inches (12.7 cm).

In this regard, the use of the blower 100 may present advantages over traditional devices used to accelerate combustion, e.g., bellows, etc. As described above, bellows and other traditional methods of circulating more air toward a fire (e.g., fanning, blowing, etc.) often provide less than ideal circulation of air needed to accelerate combustion. For example, these traditional methods may result in insufficient air circulation. Alternatively, the air circulated by these traditional methods may result in a low volume of air delivered in a narrow, high-speed column of air that is limited to a very localized area of the fire and may result in embers, ashes, or other debris being generated. In contrast, the blower 100 may deliver a relatively high volume of air at low speeds. In this regard, sufficient air is circulated in the area of the fire, yet the probability of ashes or embers being generated is reduced. Furthermore, the low speed of the air being circulated reduces the potential that any combustion present is extinguished as may happen when delivering low volume, high speed columns of air.

With further reference to FIGS. 2-4, a cross sectional view of the blower 100 along with left and right end views depicting the air outlet and inlet the air outlet 106 and air inlet 108, respectively, is shown. The fan assembly 116 may include an electric motor 118 and a fan 120. The fan 120 may be attached to an output shaft of the electric motor 118. There may also be a power source 114 disposed within the bore 108 of the cylindrical housing 102. For example, the power source 114 may be disposed adjacent to a sidewall of the bore 108. The power source 114 may be in operative communication with the electric motor 118. In this regard, the power source 114 may be selectively controlled to supply power to the electric motor 118 in order to rotate the fan 120. The fan assembly 116 may be oriented within the bore 108 such that the axis rotation of the fan assembly 116 is substantially co-axial with the central axis 110 of the bore 108.

As depicted in FIG. 2, the fan assembly 116 may be positioned adjacent to the inlet opening 104. Additionally, the fan 120 may be positioned in the bore 108 upstream with respect to the electric motor 118. As used herein, upstream and downstream may refer to the flow of air through the bore 108 when the fan assembly 116 is in operation. Thus, for a feature that is upstream of a referenced feature may be nearer to the outlet opening 104 than the referenced feature. In a similar regard, a feature that is downstream of a referenced feature may be nearer to the outlet opening 106 than the referenced feature.

FIG. 3 depicts a left end view of the blower 100. Accordingly, the outlet opening 106 is depicted. The outlet opening 106 may be covered by an outlet grill 124. FIG. 4 depicts a right end view of the blower 100 such that an inlet opening 104 is depicted. The inlet opening 104 may also include and inlet grill 122. The inlet and/or outlet grills 122 and 124 may prevent debris from entering or exiting the bore and may limit access to the interior of the bore 108. Also seen in FIG. 4 is a plug connector 126. The plug connector 126 may be in operative communication with the power source 114. In this regard, the plug connector 104 may be used to re-charge the power source 114.

FIG. 4 also depicts a speed controller 164. In one embodiment, the speed controller 164 may comprise a switch (e.g., a toggle switch or the like). The speed controller 164 may be accessible from an exterior of the cylindrical housing 102 and be manipulated to control the speed of the fan assembly 116. For example, the speed controller 164 may be a multi position switch, e.g., having an "OFF", "HIGH", and "LOW" position). In this regard, the speed controller 164 may control the power delivered to the fan assembly 116 and thereby the speed of the fan assembly 116. Alternatively, the speed controller 164 may be continuously adjustable (e.g., a potentiometer, pulse wave generator, or the like).

Figure 5:
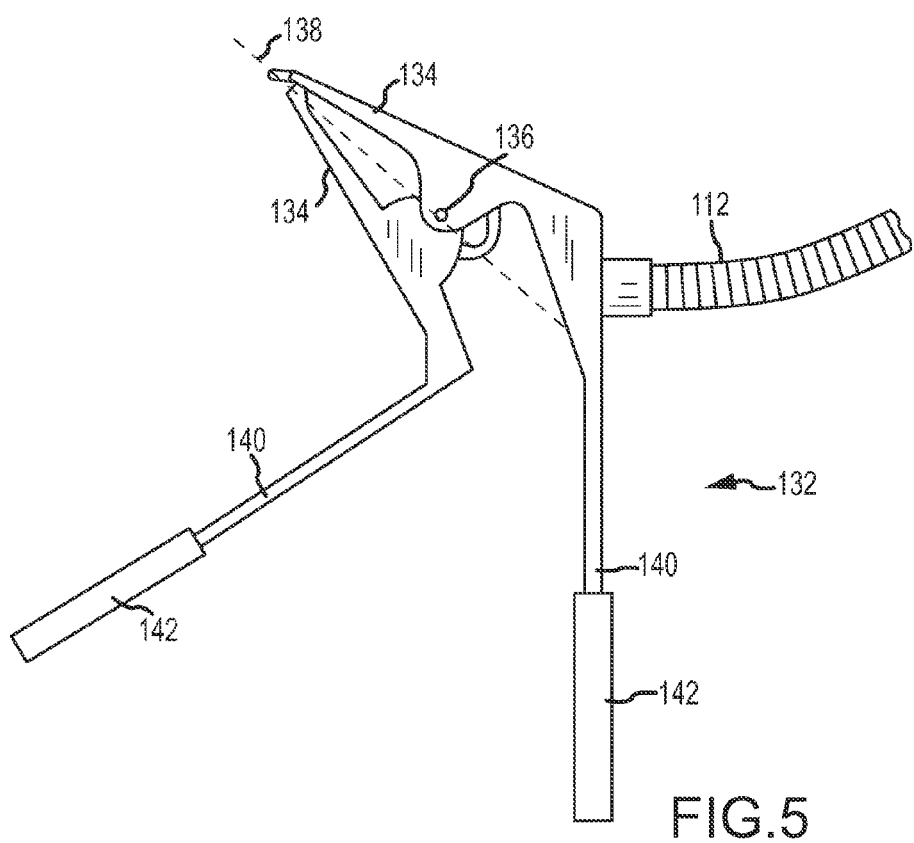
FIG. 5 depicts a side view of an embodiment of a clip.
Figure 6:
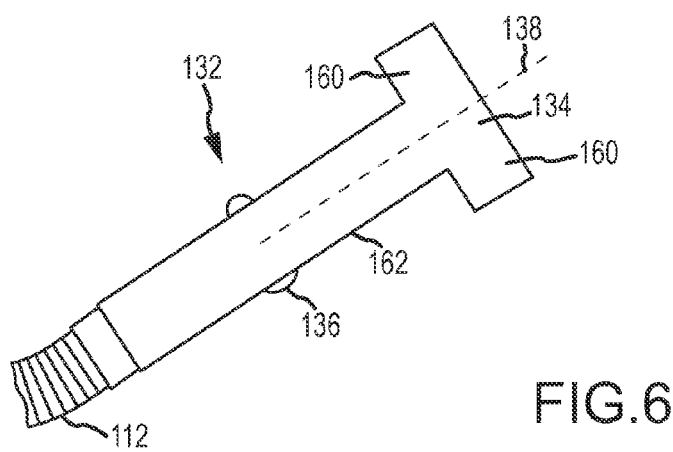
FIG. 6 depicts a top view of the embodiment of a clip shown in FIG. 5.

With additional reference to FIGS. 5 and 6, an embodiment of a clip 132 is depicted. The clip 132 may be used to secure the blower 100 to a structure adjacent to a fire. The clip 132 may be provided in operative engagement with the flexible member 112 (e.g., on an opposite end of the flexible member 112 as the blower assembly 100). In this regard, the clip 132 may be used to attach the flexible member 112 and the blower 100 to a structure. For example, the structure to which the clip 132 and blower 100 are attached may be adjacent to a fire so that the flexible member 112 may be manipulated to align the blower 100 (e.g., the central axis 110) with the fire. In this regard, the blower 100 may be positioned as described above such that the blower 100 is operative to induce airflow towards the fire.

The clip 132 may include opposing jaw members 134. The opposing jaw members 134 may be pivotal about a hinge 136. In this regard, a center line of the jaw opening 138 may extend between an interface of the opposing jaw portions 134 and the hinge 136 as depicted in FIG. 5. The jaw members 134 may be biased to a closed position. Thus, the jaw members 134 may be selectively opened so that the clip 132 may be placed on a structure. The clip 132 may also include clip handles 140. The clip handles 140 may be provided integrally with respective ones of the opposing jaw members 134. In this regard, the clip handles 140 may be manipulated (e.g., squeezed together) so as to open the opposing jaw members 134 for placement with respect to the structure. The clip handles 140 may be provided with heat insulation material 142. It will be appreciated that the structure to which the clip 132 is attached may be adjacent to the fire such that the structure and/or the clip 132 may be heated by the fire. In this regard, the clip handles 140 may become heated as well. The heat insulation material 142 provided on the clip handles 140 may provide some protection for a user manipulating the heated clip handles 140.

Furthermore, as depicted in FIG. 5, the clip handles 140 may extend away from the center line of the jaw opening 138. In this regard, when the clip 132 is affixed to a structure adjacent a fire (e.g., charcoal grill), the clip handles 140 may extend away from the centerline of the jaw opening 138 and be shielded from the fire. In this regard, the clip handles 140 may not be exposed to direct radiant heat from the fire as will be discussed further below with respect to FIG. 10. Furthermore, clip handles 140 may extend away from the jaw members 134 and be shaped such that little heat transfer occurs at the end of the clip handles 140 adjacent the insulation 142. For example, the clip handles 140 may extend away from the centerline 138 substantially perpendicularly such that the clip handles 140 and opposing jaw members 134 are at a substantially right angle. Furthermore, the clip handles 140 may be, in one embodiment, at least 4 inches (10 cm) in length, and more preferably, at least 5 inches (12.7 cm) in length. In this regard, the clip handles 140 may be manipulated even when the clip 132 is positioned adjacent to the fire without becoming heated to the point where a user may not easily handle the clip handles 140.

With further respect to FIG. 6, a top view of the clip 132 is shown. In this regard, it may be appreciated that the opposing jaw members 134 be of a generally "T" shaped configuration such that the jaw members 134 include projections 160 extending laterally away from the center line 138 of the jaw opening 134. In this regard, the projections 160 may extend laterally beyond the jaw body 162.

In FIG. 2 described above, one potential configuration of the fan assembly 116 is shown positioned in the bore 108 of the cylindrical housing 102. FIGS. 7 and 8 depict alternative potential arrangements of the fan assembly 116 in the bore 108. In FIG. 7, the fan assembly 116 may be positioned downstream of the power source 114 in the bore 108. The fan 120 may be positioned upstream of the electric motor 118. As further depicted in FIG. 8, the arrangement of the fan 120 with respect to the electric motor 118 may be reversed such that the fan 120 is positioned downstream of the electric motor 118 while the fan assembly 116 is still downstream of the power source 114. This alternative arrangement of the fan 120 and electric motor 118 wherein the fan 120 is downstream of the motor 118 may be used in either the case shown in FIG. 8 where the fan assembly 116 is provided downstream of the power source 114 or in the arrangement shown in FIG. 2 wherein the fan assembly 116 is positioned upstream from the power source 114.

Regardless of this specific implementation of the position of the fan assembly 116 in the bore 108, the fan assembly 116 and the power source 114 may comprise a removable unit 144 that is disposed within the bore 118 as shown in FIG. 9C. With respect to FIGS. 9A-9C, one embodiment for the progression of the removal of the removable unit 144 is depicted. The fan assembly 116 and the power source 114 may be provided on an inner chassis 146. For example, the inner chassis 146 may be a one-piece motor mount for supporting the electric motor 118 and a fan housing (e.g., including the inlet grill 122 or other structure for housing the fan 120). In one embodiment, the electric motor 118 may be a 370 type DC motor with a voltage range of 2 to 13 volts. Accordingly, the fan assembly 116 may rotate at speeds between about 5,000 rpm and about 30,000 rpm. In this regard, these speeds may provide a high volume of air at relatively low speeds, which as described above may be advantageous. Furthermore, such speeds may allow for high efficiency operations and relatively low noise outputs.

The inner chassis 146 may be disposed within the bore 108. For example, the inner chassis 146 may be dimensioned such that it is received in the bore 108 by way of an interference fit. Alternatively, engagement features may be provided on the bore 108 and/or the inner chassis 146 to facilitate retention of the inner chassis 146 within the bore 108. In any regard, the removable unit 144 may be slidably engaged with the bore 108, (e.g., in a direction towards the inlet opening 104). As such the removable unit 144 may be selectively removed from within the bore 108.

Once the removable unit 144 has been removed from the bore 108 as shown in FIG. 9C, the power source 114 may be accessible. As depicted, the power source 114 may comprise one or more batteries 148. Once the removable unit 144 has been removed from the bore 108, the power source 114 may be accessed such that the batteries 148 may be replaced. In this regard, the blower 100 may be portable in that it does not require a wired connection to a power source. Moreover, the batteries 148 may be rechargeable such that, for example, the blower 100 may be provided with external power (e.g., via the plug connector 126 shown above in FIG. 4 to recharge the batteries. In one embodiment, the batteries 148 may comprise a plurality of AAA sized 1.2 V NiMH cells. Such batteries are readily available and economical. However, other size and types of batteries 114 may be provided. For example, lithium ion type batteries may be employed. Alternatively, the batteries 114 may be accessed by other mechanisms, e.g., a door, slot, or other selectively accessible feature.

Figure 10:
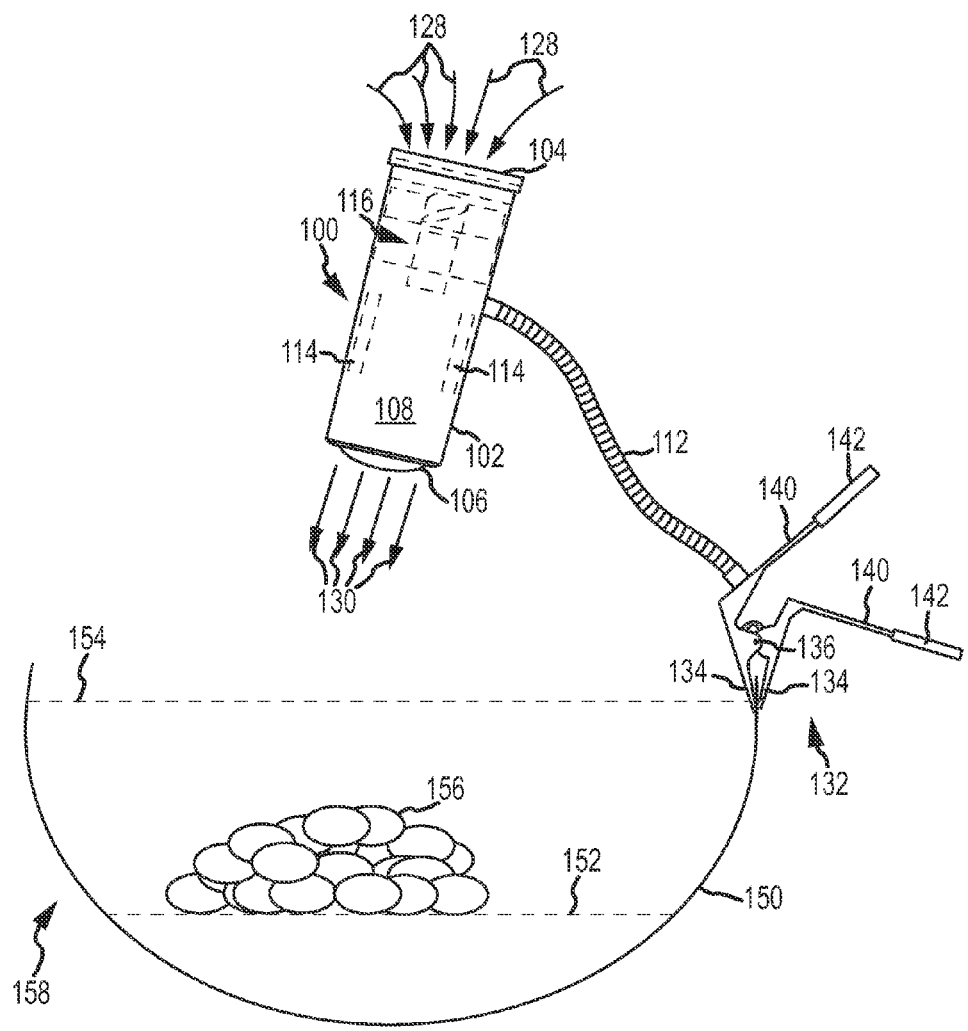
FIG. 10 depicts an embodiment of a blower assembly in position on a charcoal grill.

FIG. 10 depicts one embodiment of a blower 100 in use with a charcoal grill 158. The charcoal grill 158 may include a grill sidewall 150. The grill may also include a charcoal grate 152 extending between opposing portions of the grill sidewall 150. A charcoal pile 156 may be provided on the charcoal grate 152. A cooking grate 154 may also extend between opposing portions of the charcoal sidewall 150. The charcoal pile 156 may be disposed on the charcoal grate 152 and below the cooking grate 154. In this regard, the charcoal pile 156 may be lit to provide heat for cooking on the cooking grate 154.

In order to accelerate the rate of combustion the charcoal pile 156 (e.g., to accelerate the rate at which the charcoal pile 156 becomes ready for cooking), the blower 100 may be clipped by way of the clip 132 to the sidewall 150 of the grill 158. A flexible member 112 may be operatively attached to the blower 100 and the clip 132. In this regard, the blower 100 need not be held by a user while in use. For example, the blower 100 may be supported by the flexible member 112 such that the flexible member 112 is manipulated in order to position the blower 100 in a desired orientation. The blower 100 may be positioned by way of, for example, one or more of translation of the cylindrical housing in a direction transverse to the central axis, translation of the cylindrical housing in a direction along the central axis, or rotation of the cylindrical housing about a rotation axis transverse to the central axis. Thus, a user may attend to other matters while the fire in the charcoal pile 156 is established.

As will be appreciated from FIG. 10, when the clip 132 is attached to the grill sidewall 150, the handle portions 140 may be disposed with respect to the charcoal pile 156 so as to minimize the exposure of the handle portions 140 to radiant heat generated by the charcoal pile 156. That is, the major surface areas of the handle portions 140 may be parallel to the direction of the radiant heat generated by the burning charcoal pile 156. Additionally or alternatively, as can best be appreciated from the lower handle portion 140 of FIG. 10, the handle portion 140 may be arranged such that the grill sidewall 150 is disposed between the burning charcoal pile 156 and the handle portion 140 so as to further reduce the amount of radiant heat to which the handle portion 140 is exposed. Additionally, as described above, in that the handle portions 140 may have a length of not less than 4 inches (10 cm), and more preferably not less than 5 inches (12.7 cm), the amount of heat that is conducted to the end portion of the handle portions 140 (e.g., adjacent to the heat insulation material 142 may be reduced. As such, the shape, size, and location of the clip 132 may reduce the amount of heat to which the handle portions 140 are exposed so as to maintain relatively low temperatures (i.e., those temperatures in the range that can safely be handled by a user without the use of additional heat protections devices).

The flexible member 112 may be a "gooseneck" type flexible metal tubing that is available in a variety of diameters. Flexible metal tubing of this type is available in a variety of stiffness values, and which can be bent into any shape or position up to a certain acute arc. The arc to which the flexible metal tubing may be shaped becomes more flat as the stiffness of the particular tubing increases. In one embodiment, the flexible member 112 may be approximately 12 inches (30 cm) in length. This may provide a sufficient amount of available deflection of the flexible member 112 to adjustably position the blower 100. However, other lengths of flexible members 112 may be provided, for example, between 4 inches (10 cm) and 24 inches (61 cm) in length. In one embodiment, the flexible member may comprise a ⅝ inch (1.5 cm) diameter, medium stiffness gooseneck type metal tubing, which provides a workable combination of flexibility and stiffness to support the blower 100, while allowing adequate reach of the flexible member 112 to allow correct positioning of the blower 100 in a wide range of applications. However, the flexible member 112 may also have a different thickness, length, and/or stiffness, as the particular application and manufacturing necessities dictate.

As can be appreciated in FIG. 10, the clip handles 140 may extend generally away from the burning charcoal pile 156 as such the clip handles 140 remain relatively cool. The flexible member 142 may extend between the blower 100 and the clip 132 to supportably engage the blower 100. In this regard, the blower 100 may be positioned shown such that the outlet air 130 is directed towards the charcoal pile 156 in order to provide additional combustion air to the charcoal pile 156. It will be further appreciated that the inlet opening 104 is generally positioned away from the burning charcoal pile 156. In this regard, the blower 100 may remain cool as inlet air 128 is drawn into the blower 100 away from the burning charcoal pile 156. In this regard, a constant supply of cool inlet air 128 may be passed through the blower 100 to continually cool the blower 100.

While FIG. 10 depicts the blower 100 in position with respect to a charcoal grill 158, it will be appreciated that the blower 100 may be secured to another structure to accelerate the combustion of other types of fires. For example, the blower 100 may be secured to a smoker, a fireplace, a wood stove, an andiron, near a campfire, near a fire pit, etc. As such, it will be appreciated that the blower 100 may be exposed to conditions associated with outdoor locations. As such, the cylindrical housing 102, clip 132, or other component of the blower 100 may be constructed from stainless steel or other materials that withstand such environments (e.g., polymers and the like). Furthermore, the power source 114 and fan assembly 116 may be electrically insulated to help assist in providing safe operation even when exposed to rain, snow, or other moisture experienced outdoors.

A number of additional features may be provided in various embodiments of a blower. For example, a light (e.g., a LED) may be provided with the blower 100. The light may be disposed within the cylindrical housing 102 and be operable to shine light in the direction of the flow of air out of the outlet opening 106. As such, when the blower 100 is positioned to direct air toward a fire, the light may illuminate a field downstream of the blower 100. Additionally, a power meter and/or alarm may be provided to provide an indication of when the power supply is running low on power. Thus, a user may be alerted that the power supply is in need of charging. Furthermore, the clip 132 may integrate one or more magnets to assist in attaching the clip 132 to a structure. In one embodiment, rather than the jaw structure described above, a magnet alone may be used to attach the blower 100 and flexible member 112 to a structure.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. An electric blower operable to provide combustion air to a fire, the electric blower comprising:
    a cylindrical housing defining a bore extending from an inlet opening of the housing to an outlet opening of the housing, wherein the bore extends along at least a portion of a central axis of the cylindrical housing wherein the cylindrical housing is operatively connected to a flexible member for supportive engagement of the cylindrical housing by the flexible member;
    a fan assembly disposed within the bore between the inlet opening and the outlet opening, the fan assembly having an axis of rotation substantially coaxial with the central axis; and
    a power source disposed in the bore that is in operative communication with the fan assembly to power the fan assembly, wherein the power source comprises at least one battery;
    wherein the fan assembly is rotatable about the axis of rotation to induce air flow through the bore between the inlet opening and the outlet opening such that air is expelled from the outlet opening in a direction substantially parallel with the central axis and the cylindrical housing is positionable with respect to the fire to direct air toward the fire, and wherein the fan assembly and the power source comprise a removable unit that is selectively removable from the cylindrical housing.

2. The electric blower according to claim 1, wherein the cylindrical housing is positionable at least with respect to one of translation of the cylindrical housing in a direction transverse to the central axis, translation of the cylindrical housing in a direction along the central axis, or rotation of the cylindrical housing about a rotation axis transverse to the central axis.

3. The electric blower according to claim 2, wherein the flexible member is infinitely adjustable to define a continuum of blower positions.

4. The electric blower according to claim 1, wherein the power source comprises at least one battery.

5. The electric blower according to claim 4, wherein the at least one battery is rechargeable.

6. The electric blower according to claim 1, wherein when the inlet opening is disposed at a first end portion of the cylindrical housing and the outlet opening is disposed at a second end portion of the cylindrical housing opposite the first end portion.

7. The electric blower according to claim 6, wherein the cylindrical housing is positioned with respect to the fire so as to direct air exiting the outlet opening toward the fire, the inlet opening is disposed further from the fire than the outlet opening.

8. The electric blower according to claim 7, wherein the inlet opening comprises substantially the entire cross sectional area of the cylindrical housing at the first end portion and the outlet opening comprises substantially the entire cross sectional area of the cross sectional housing at the second end portion.

9. The electric blower according to claim 8, wherein the outlet opening is smaller than the inlet opening.

10. The electric blower according to claim 1, wherein the cylindrical housing comprises stainless steel.

11. The electric blower according to claim 1, further comprising a fan controller in operative communication with the fan assembly operable to control the speed of the fan assembly.

12. The electric blower according to claim 1, wherein the flexible member is operatively engaged with a clip for selective attachment of the electric blower to a support structure.

13. The electric blower according to claim 12, wherein the clip comprises a clamp member having opposing jaws members pivotal about a hinge, wherein a jaw opening centerline is defined between the hinge and an interface of the opposing jaw members when closed, and wherein the clip comprises handle portions extending in a direction extending away from the jaw opening centerline.

* * * * *